April 22, 1947.  F. H. SHEPARD, JR  2,419,292
SYSTEM FOR TRANSMITTING TWO SIMULTANEOUS INTELLIGENCES
Filed Nov. 15, 1944  2 Sheets-Sheet 1

INVENTOR.
FRANCIS H. SHEPARD, JR.
BY
Darby & Darby
ATTORNEYS

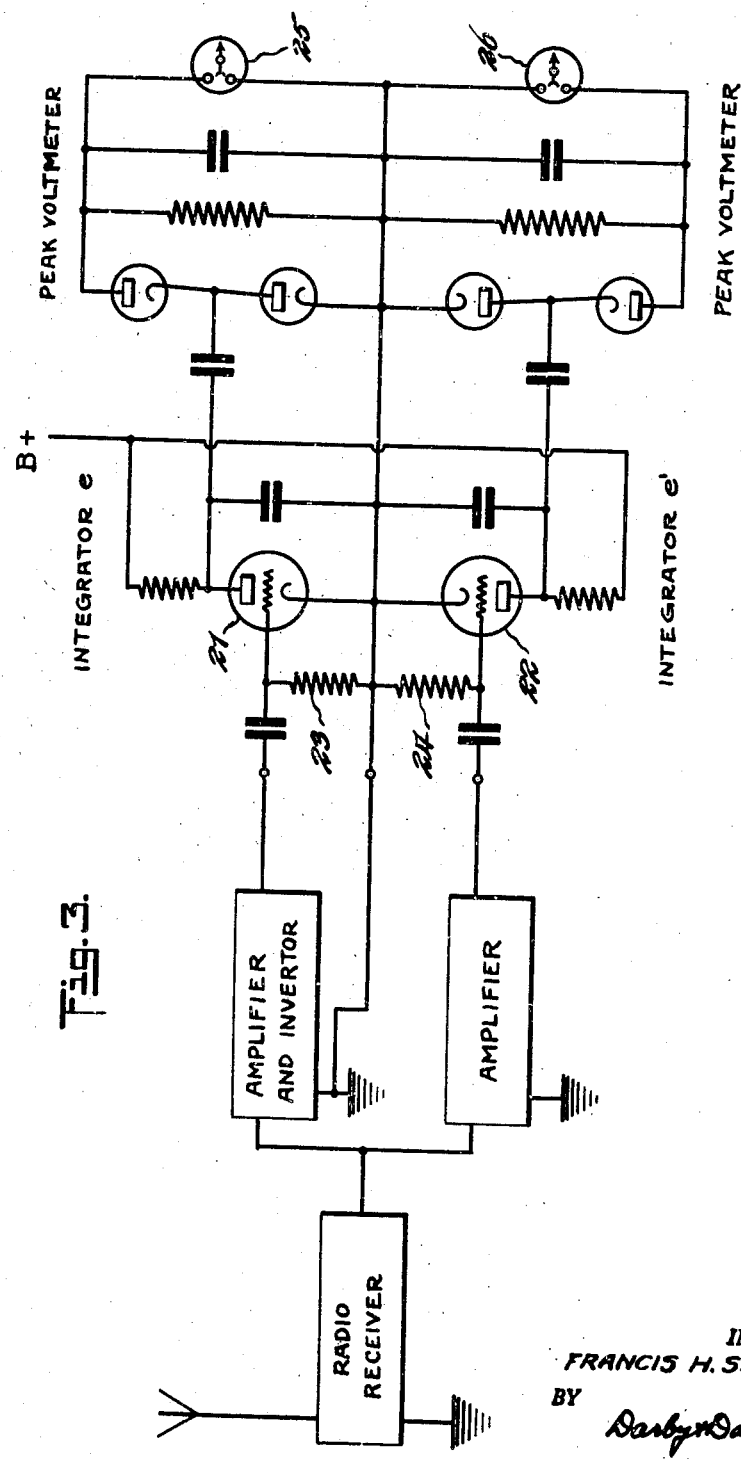

Patented Apr. 22, 1947

2,419,292

UNITED STATES PATENT OFFICE 2,419,292

SYSTEM FOR TRANSMITTING TWO SIMULTANEOUS INTELLIGENCES

Francis H. Shepard, Jr., Madison, N. J., assignor, by mesne assignments, to Remco Electronic, Inc., New York, N. Y., a corporation of New York Application November 15, 1944, Serial No. 563,567

6 Claims. (Cl. 179—15)

It is frequently desired to send simultaneously two intelligences which represent, for example, conditions which it is desired to record or observe at a distant point. In meteorological observation, for example, it is now the practice to send up balloons bearing radio equipment which transmits signals to indicate the conditions encountered in the atmosphere. My system could be used in such a device and the respective intelligences could represent temperature and humidity, the variable elements in my system which control the signal being transmitted being actuated by devices responsive respectively to temperature and humidity. Or, as another example, my device could be used to send simultaneously a signal representing any two of the functions of pressure, temperature and height of a liquid in a storage tank. Or, it could be made to send a signal representing the horizontal and vertical components of handwriting, or a drawing, in distance writing equipment.

A feature of my invention is the provision of means whereby each of the intelligences is translated into a function of time and a signal is produced having two components which represent respectively two independent functions of time.

In the drawings:

Figure 3 is a circuit diagram showing a receiver.

Figure 1:
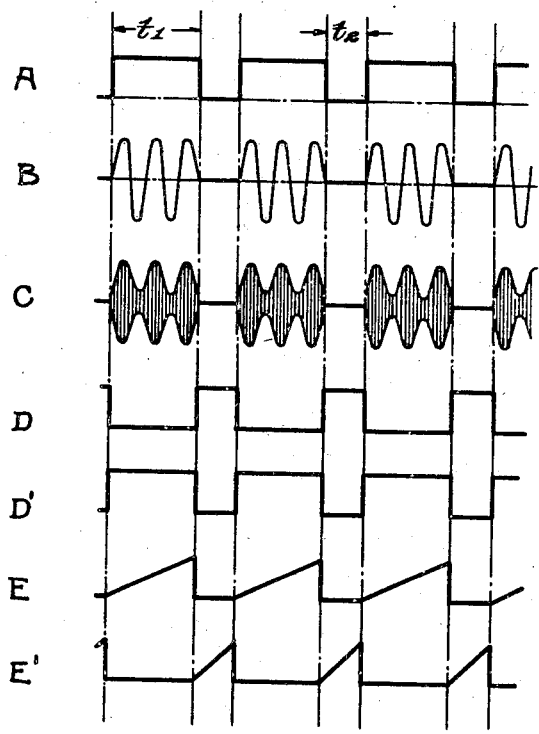
Figure 1 shows a series of graphs illustrating the operation of my invention.

Figure 1 shows in curve A the wave form of a signal into which the two time elements T1 and T2 can be verged separately and independently. T1 is used to represent one function, while T2 is used to represent another function. This signal can be transmitted directly over any communication circuit, or it can be used to modulate a carrier and produce a signal of the type illustrated in curve B of Figure 1. This carrier modulated signal can then be communicated directly or it may be used as a sub-carrier to modulate the higher frequency carrier of a radio transmitter. If so used the signal would be that shown as curve C of Figure 1.

If a radio carrier is modulated to produce the wave as shown in curve C, then the detected output will look like curve B, and must be again detected to give the signal shown by curve D. Whichever of the forms the signal takes, and whatever means are used to receive it, and to detect it if necessary, the signal eventually reproduced at the receiver will be as shown in curve D. At this point the signal may be diverted into two channels, one of which is an amplifier and the other is an amplifier and inverter so that the two outputs are respectively as shown in curves D and D' of Figure 1. These two signals may then be integrated to produce two waves of the form shown in E and E', in which the time during which the voltage is rising is respectively a function of T1 and T2. As the maximum to which the voltage rises is a function of the time during which the voltage is rising, an indication of this maximum voltage will therefore be an indication of the functions T1 and T2. The signals shown at E and E' may, therefore, be measured in two peak voltage meters and the instantaneous outputs of the volt meters will represent the functions T1 and T2 at any instant. The volt meters by suitable calibration may give a continuous direct reading of the two intelligences transmitted, such as temperature and humidity, pressure and liquid level, etc.

Figure 2:
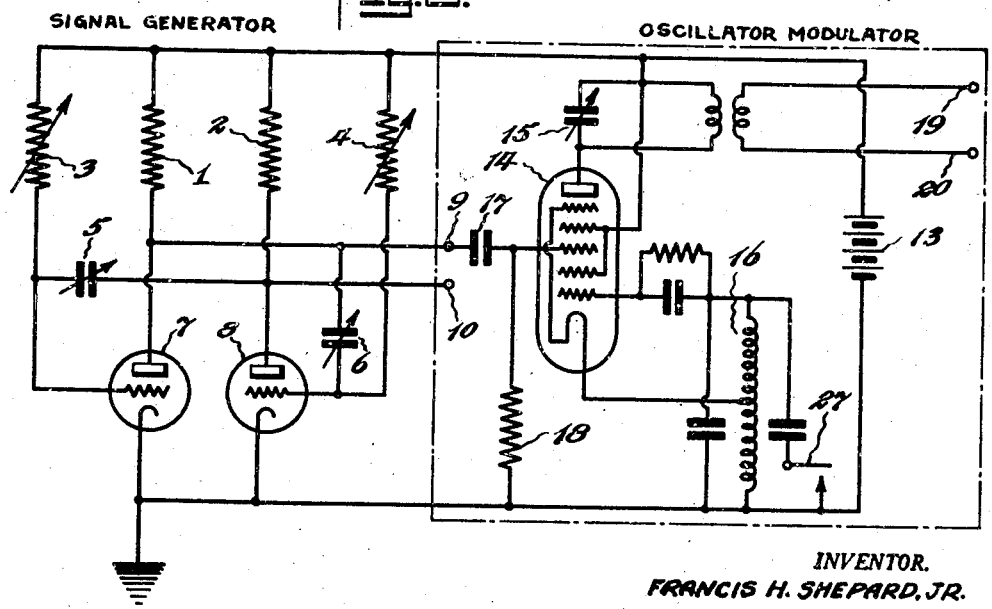
Figure 2 is a circuit diagram showing a transmitter.

In Figure 2 I show a diagram of a circuit for transmitting the two intelligences simultaneously. The signal generator is shown at the left and consists of the two tubes 7 and 8 and their associated circuits. This circuit is essentially a multivibrator in which the voltage on the anode of each tube is impressed upon the grid of the other tube. When current is flowing through one tube, the anode of that tube will become more negative and this negative voltage applied to the grid of the other tube will cut off current through the other tube. The grid of that tube will then become more positive than the cut off voltage through the grid resistance 3 or 4, as the case may be, and current will again flow. The time T1 may be controlled by the size of resistance 3 or condenser 5, or both, or by the size of resistance 4 or condenser 6, or both, and the time T2 may be controlled by the other pair of these elements. Thus condensers 5 and 6, or resistances 3 and 4, for example, may be made responsive to the two intelligences, and consequently to produce a signal representing the two functions.

The output of the signal generator may be taken off at the terminal 9 and used to modulate a carrier wave in the oscillator modulator circuit shown at the right of Figure 2, which operates on conventional lines to produce an output across the terminals 19 and 20 of the type illustrated in curve B of Figure 1. As before stated, this output may be further modulated to produce a wave of the form shown in curve C of Figure 1, and transmitted by radio.

Figure 3 shows the receiving circuit in which the signal, if transmitted by radio, is received and detected, and then divided into two channels in one of which it is amplified and in the other of which it is amplified and inverted to produce two separate signals of the form shown in curves D and D' of Figure 1. These two signals are then applied to the integrator circuits shown in Figure 3. The signal of curve D will be applied to the grid of tube 21. When a positive hump of voltage is received this tube will draw current and its anode will become negative and remain so while the positive hump of voltage is applied to its grid. When the hump of positive voltage applied to its grid has passed the positive charge on the grid will gradually leak off through resistance 23 and tube 21 will conduct less and less current, the voltage on the anode of tube 21 thereby rising to a peak, as shown in curve E of Figure 1. The maximum voltage attained by the anode will be a function of the time during which it is permitted to rise, and consequently a function of T1.

Similarly, the signal of curve D' of Figure 1 will be applied to the grid of tube 22, and similarly integrated. Thus the peak voltages attained by the anodes of tubes 21 and 22 will correspond to the functions T1 and T2. These anode voltages may then be measured in the peak volt meters shown at the right of Figure 3. In these volt meters the dials 25 and 26 may be used to give a continuous reading of the two intelligences. They are, however, simply illustrative as the voltages may be fed into any known type of indicator or recorder to be used in any manner desired.

If it is desired to transmit a third intelligence independently of but not simultaneously with the other two, this may be done by providing a key 27, Figure 2, which will vary the frequency of the carrier oscillations. This may be used, for example, to actuate mechanism for shifting the paper when my invention is used in a distance writing device.

It will be obvious to those skilled in the art that my invention is capable of various modifications, and I do not wish to be restricted to this specific apparatus described, but only within the scope of the appended claims.

What is claimed is:

1. The method of simultaneously transmitting two intelligences, which comprises translating such intelligences into a signal having alternately a marking nature and a spacing nature in which the lengths of the marking state and the spacing state are varied respectively according to said intelligences, transmitting said signal, and detecting and integrating said signal to produce separate signals which are functions of the intelligences transmitted.

2. The method of transmitting intelligences simultaneously in a system employing impedance elements, which comprise utilizing said intelligences to vary said impedance elements, utilizing said impedance elements to produce a signal having alternately a marking nature and a spacing nature in which the lengths of the marking state and the spacing state are varied respectively according to said intelligences, transmitting and receiving said signal, and integrating said signal to reproduce an indication of said intelligences.

3. A system for transmitting simultaneous intelligences comprising a signal generator for generating a signal having alternately a marking nature and a spacing nature in which the lengths of the marking state and the spacing state are varied respectively according to said intelligences, a receiver comprising means for producing two signals, one representing the length of the marking state and one representing the length of the spacing state of signal, means for integrating said derived signals, and means for indicating their value.

4. A system for transmitting simultaneous intelligences comprising a signal generator for producing a signal having alternately a marking nature and a spacing nature in which the lengths of the marking state and the spacing state are varied respectively according to said intelligences, means for transmitting said signal, means for receiving said signal, and means for indicating said intelligences comprising means for indicating the length of the marking state of said signal directly and means for inverting said signal and indicating the value of the spacing state of said signal.

5. A system for transmitting simultaneous intelligences comprising a signal generator for producing a signal having alternately a marking nature and a spacing nature in which the lengths of the marking state and the spacing state are varied respectively according to said intelligences, means for modulating said signal, means for transmitting said modulated signal, means for receiving and detecting said modulated signal, and means for indicating said intelligences through said detected signal comprising separate channels in one of which said signal is reproduced directly and the other of which said signal is inverted, and means for indicating the values of the two signals thus produced.

6. A system for transmitting two intelligences comprising a signal generator for generating a signal having alternately a marking nature and a spacing nature, means for continuously varying the duration of the marking state according to one intelligence and means for varying the duration of the spacing state according to the other intelligence.

FRANCIS H. SHEPARD, Jr.

REFERENCES CITED

The following references are of record in the file of this patent:

UNITED STATES PATENTS

| Number | Name | Date |
|---|---|---|
| 1,928,093 | Coyle | Sept. 26, 1933 |
| 2,338,395 | Bartelink | Jan. 4, 1944 |
| 2,193,868 | Geiger | Mar. 19, 1940 |
| 2,352,634 | Hull | July 4, 1944 |
| 1,979,484 | Mathes | Nov. 6, 1934 |
| 2,380,520 | Hassler | July 31, 1945 |
| 2,298,922 | Beatty | Oct. 13, 1942 |
| 2,371,415 | Tolson | Mar. 13, 1945 |